US012719972B2

United States Patent
(12) Li

(10) Patent No.: US 12,719,972 B2
(45) Date of Patent: Aug. 25, 2026

(54) ELECTRONIC DEVICE

(71) Applicant: VIVO MOBILE COMMUNICATION CO., LTD., Guangdong (CN)

(72) Inventor: Lele Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 316 days.

(21) Appl. No.: 18/492,847

(22) Filed: Oct. 24, 2023

(65) Prior Publication Data

US 2024/0056518 A1 Feb. 15, 2024

Related U.S. Application Data

(63) Continuation of application No. PCT/CN2022/088087, filed on Apr. 21, 2022.

(30) Foreign Application Priority Data

Apr. 26, 2021 (CN) ......................... 202110451686.6

(51) Int. Cl.
*H04M 1/02* (2006.01)

(52) U.S. Cl.
CPC .................................. *H04M 1/026* (2013.01)

(58) Field of Classification Search
CPC ............. H04M 1/0235; H04M 1/0237; H04M 1/0241; H04M 1/026; H04M 1/0268; H04M 1/03; H04M 1/035
See application file for complete search history.

(56) References Cited

U.S. PATENT DOCUMENTS 9,807,483 B1 10/2017 Edson
10,536,566 B1 1/2020 Cheng
12,167,196 B2 * 12/2024 Feng .................. H04R 1/2834
(Continued)

FOREIGN PATENT DOCUMENTS

CN 202818539 U 3/2013
CN 109324780 A 2/2019
(Continued)

OTHER PUBLICATIONS

Chen et al., “Electronic Device”, CN 112055107 A, Dec. 8, 2020 (English Text) (Year: 2020).*
(Continued)

*Primary Examiner* — Quochien B Vuong
(74) *Attorney, Agent, or Firm* — BROOKS KUSHMAN P.C.

(57) ABSTRACT

An electronic device including a device housing and a sound generating module. The device housing includes a first housing portion and a second housing portion. The first housing portion is movably disposed on the second housing portion to enable the electronic device to switch between a first state and a second state. The sound generating module is located on either the first housing portion or the second housing portion. The sound generating module is provided with a first rear cavity and a first connecting hole communicating with the first rear cavity. The electronic device is able to form a second rear cavity. In the first state, the first rear cavity communicates with the second rear cavity via the first connecting hole. In the second state, the first connecting hole is blocked.

13 Claims, 9 Drawing Sheets

(56) References Cited

U.S. PATENT DOCUMENTS

| | | | | |
|---|---|---|---|---|
| 12,261,972 | B2 * | 3/2025 | Lee | H04M 1/0268 |
| 2009/0156264 | A1 * | 6/2009 | Cho | H04M 1/0235 455/566 |
| 2010/0329496 | A1 | 12/2010 | Mottonen et al. | |
| 2017/0208162 | A1 | 7/2017 | Slotte et al. | |
| 2023/0041843 | A1 | 2/2023 | Luo | |
| 2023/0262156 | A1 | 8/2023 | Guo | |

FOREIGN PATENT DOCUMENTS

| | | | |
|---|---|---|---|
| CN | 109769052 | A | 5/2019 |
| CN | 211127868 | U | 7/2020 |
| CN | 111526453 | A | 8/2020 |
| CN | 111770221 | A | 10/2020 |
| CN | 112055107 | A | 12/2020 |
| CN | 112291397 | A | 1/2021 |
| CN | 112291399 | A | 1/2021 |
| CN | 112398986 | A | 2/2021 |
| CN | 212519077 | U | 2/2021 |
| CN | 112600963 | A | 4/2021 |
| CN | 112615950 | A | 4/2021 |
| CN | 113099014 | A | 7/2021 |
| CN | 113114818 | A | 7/2021 |
| JP | 2009055534 | A | 3/2009 |

OTHER PUBLICATIONS

Guo, “Electronic Device”, CN 112398986 A, Feb. 23, 2021 (English Text). (Year: 2021).*

Kimura, “Portable Terminal”, JP 2009055534 A, Mar. 12, 2009 (English Text). (Year: 2009).*

First Office Action for Japanese Application No. 2023-565415, dated Oct. 29, 2024, 5 Pages.

First Office Action for Chinese Application No. 202110451686.6, dated Nov. 14, 2022, 9 Pages.

International Search Report and Written Opinion for Application No. PCT /CN2022/088087, dated Jul. 8, 2022, 10 Pages.

* cited by examiner

ELECTRONIC DEVICE

CROSS-REFERENCE TO RELATED APPLICATIONS

The application is a continuation of PCT International Application No. PCT/CN2022/088087 filed on Apr. 21, 2022, which claims priority to Chinese Patent Application No. 202110451686.6 filed on Apr. 26, 2021, which are incorporated herein by reference in their entireties.

TECHNICAL FIELD

This application pertains to the field of communications device technologies, and in particular, to an electronic device.

BACKGROUND

With the development of communications technologies and increasing user demands, scalable electronic devices are the future. Moreover, the future trend of electronic devices is towards thinness, with increasingly compact internal spatial layouts. Volume of a rear cavity of a sound generating module is limited by the internal space of the electronic device, and available space in the rear cavity of the sound generating module is becoming increasingly constrained. The volume of the rear cavity determines sounding performance of the sound generating module, and a decrease in volume of the rear cavity leads to poor sound performance of the electronic device.

SUMMARY

An electronic device includes a device housing and a sound generating module, where the device housing includes a first housing portion and a second housing portion, the first housing portion is movably disposed on the second housing portion to enable the electronic device to switch between a first state and a second state, the sound generating module is located on either the first housing portion or the second housing portion, and the sound generating module is provided with a first rear cavity and a first connecting hole communicating with the first rear cavity, where the electronic device is able to form a second rear cavity, where

- in the first state, the first rear cavity communicates with the second rear cavity via the first connecting hole; in the second state, the first connecting hole is blocked; and
- one of the first state and the second state is an expanded state, and the other is a contracted state.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

DESCRIPTION OF REFERENCE SIGNS

- 100—device housing, 110—first housing portion, 120—second housing portion, 121—guiding protrusion;
- 200: flexible display;
- 300—sound generating module, 310—first rear cavity, 320—first connecting hole, 330—third positioning structure;
- 400—cavity, 410—second rear cavity, 420—second connecting hole, 430—first positioning structure, 440—second positioning structure, 450—guiding groove;
- 610—first elastic member, 620—second elastic member, 630—third elastic member;
- 710—first rear cavity component, 711—first chamfered surface, 720—second rear cavity component, 721—second chamfered surface;
- 800—functional component;
- 900—separating member, and 910—tip.

DETAILED DESCRIPTION

To make the objectives, technical solutions, and advantages of this application clearer, the following clearly and completely describes the technical solutions of this application with reference to specific embodiments of this application and corresponding drawings. Apparently, the described embodiments are merely some but not all of the embodiments. All other embodiments obtained by persons of ordinary skill in the art based on the embodiments of this application without creative efforts shall fall within the protection scope of this application.

The technical solutions disclosed in the embodiments of this application are described in detail below with reference to the accompanying drawings.

Figure 1:
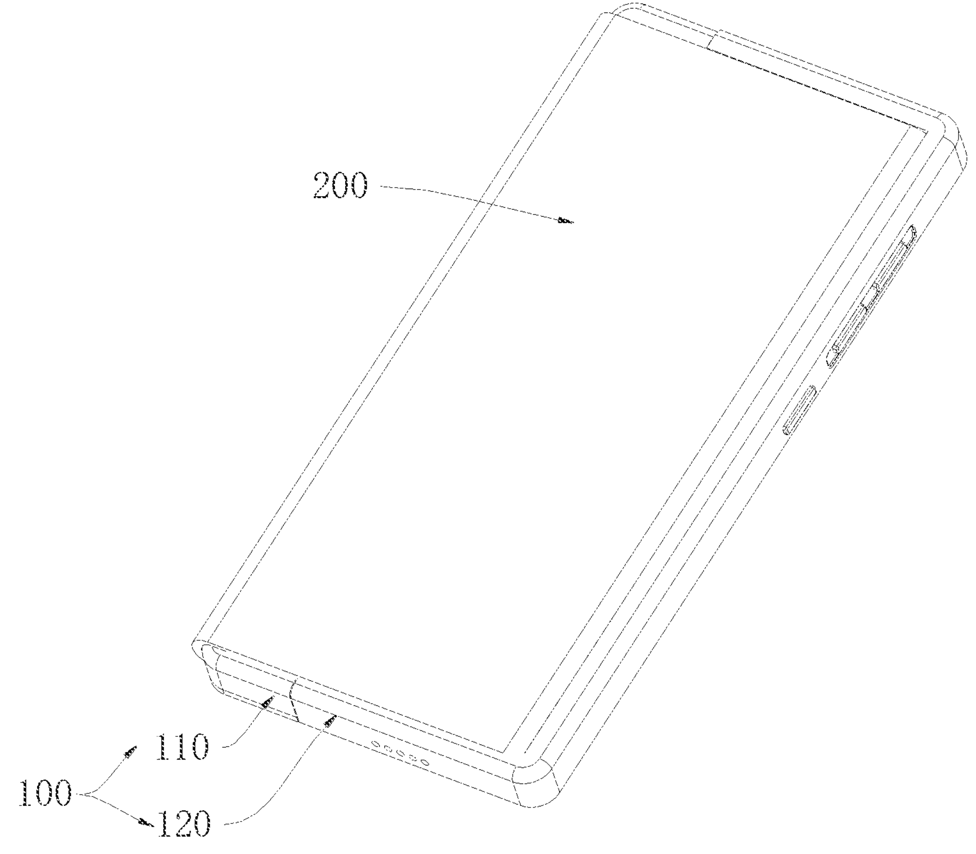
FIG. 1 is a schematic diagram of an electronic device in a contracted state according to this application.
Figure 2:
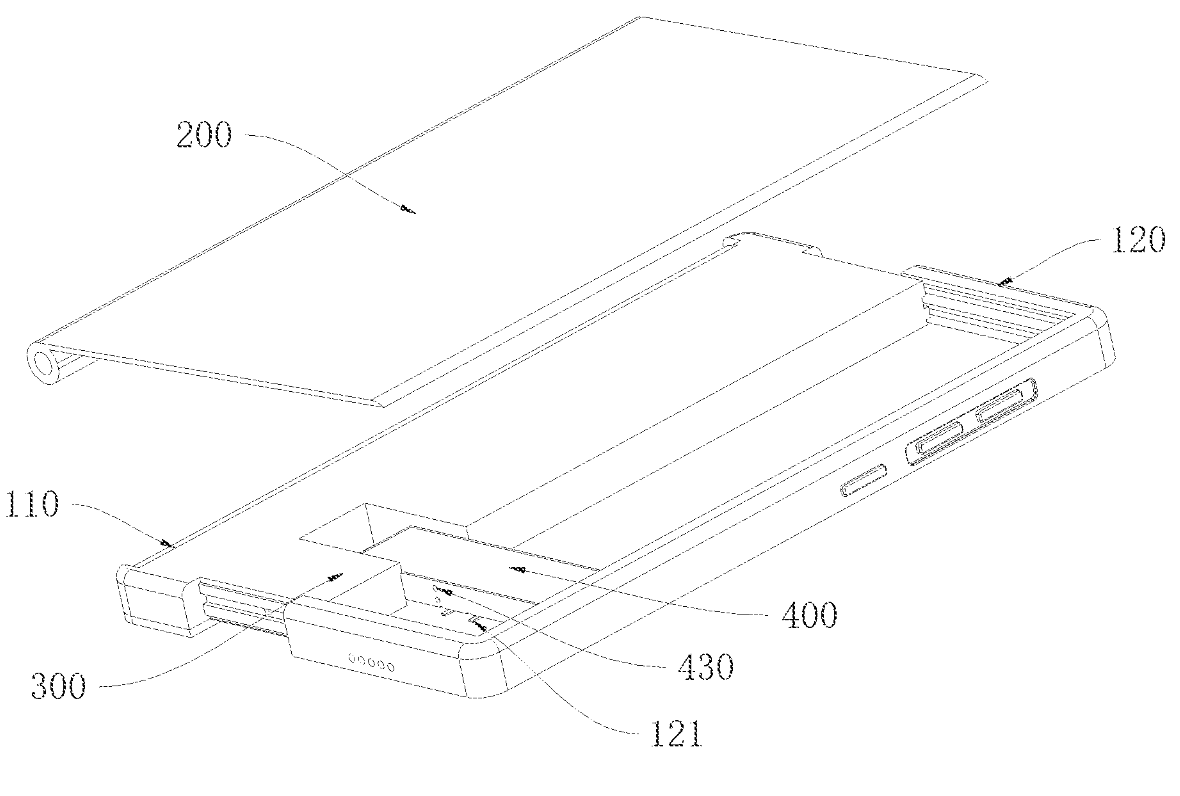
FIG. 2 is a partial exploded view of an electronic device in an expanded state according to this application.
Figure 3:
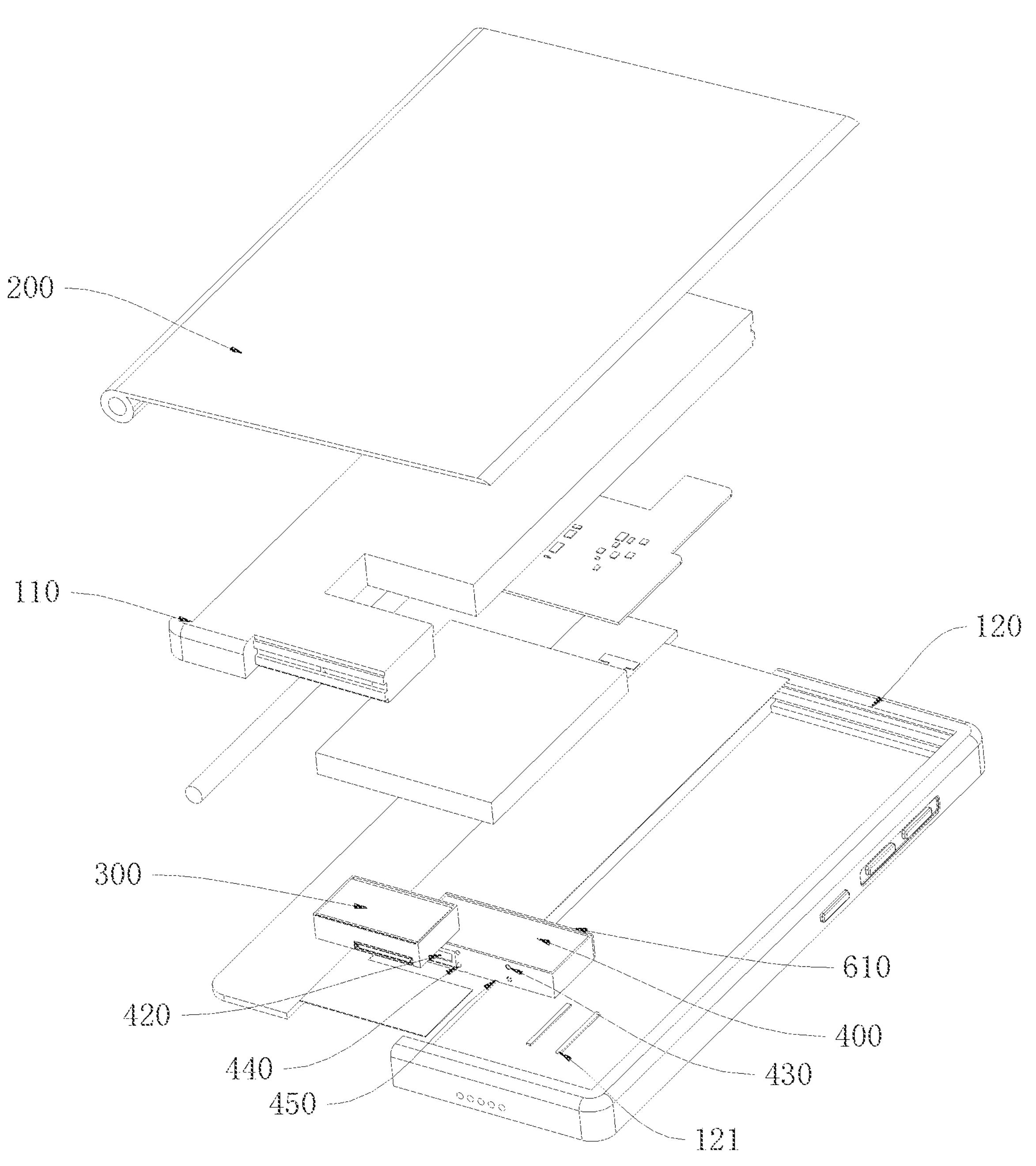
FIG. 3 is an exploded view of an electronic device in an expanded state according to this application.
Figure 4:
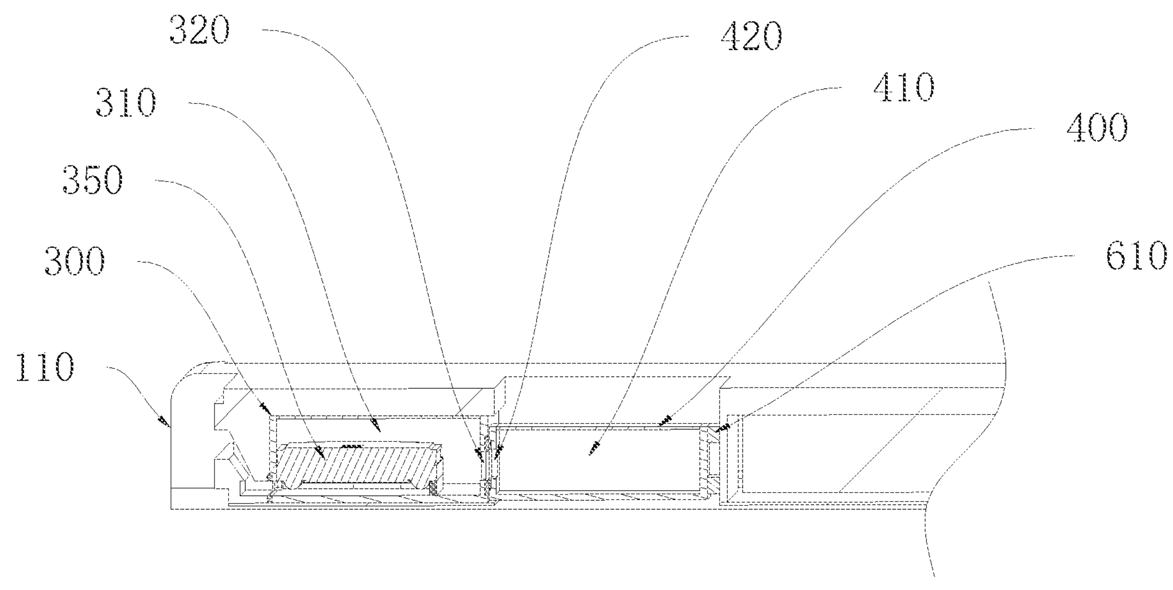
FIG. 4 is a partial sectional view of an electronic device according to this application.
Figure 5:
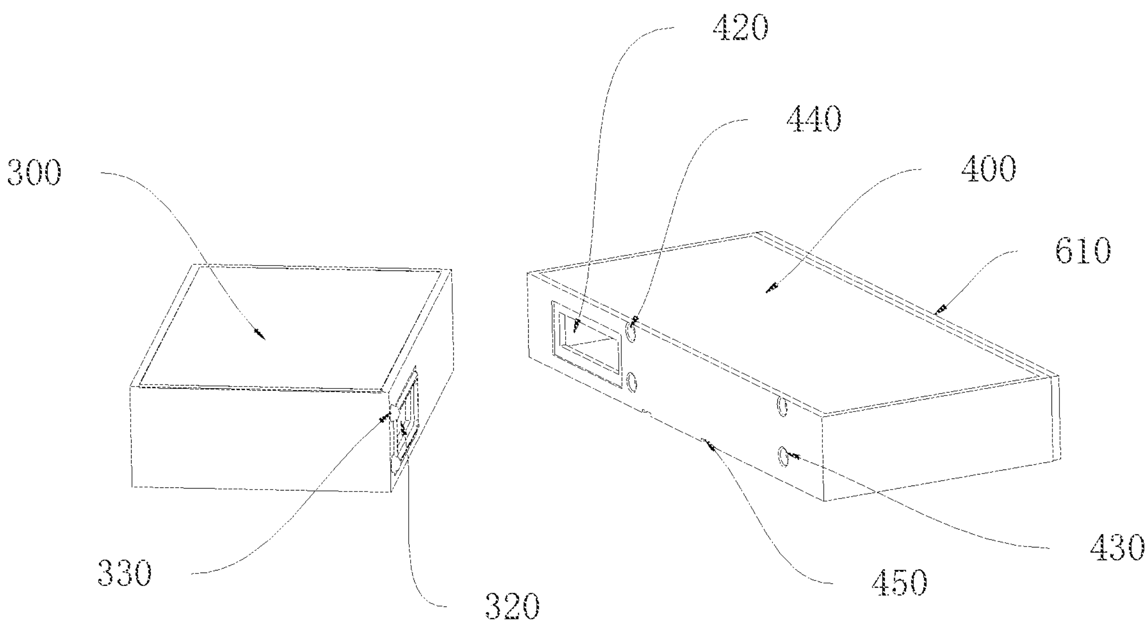
FIG. 5 is a schematic structural diagram of a sound generating module and a cavity according to this application.
Figure 6:
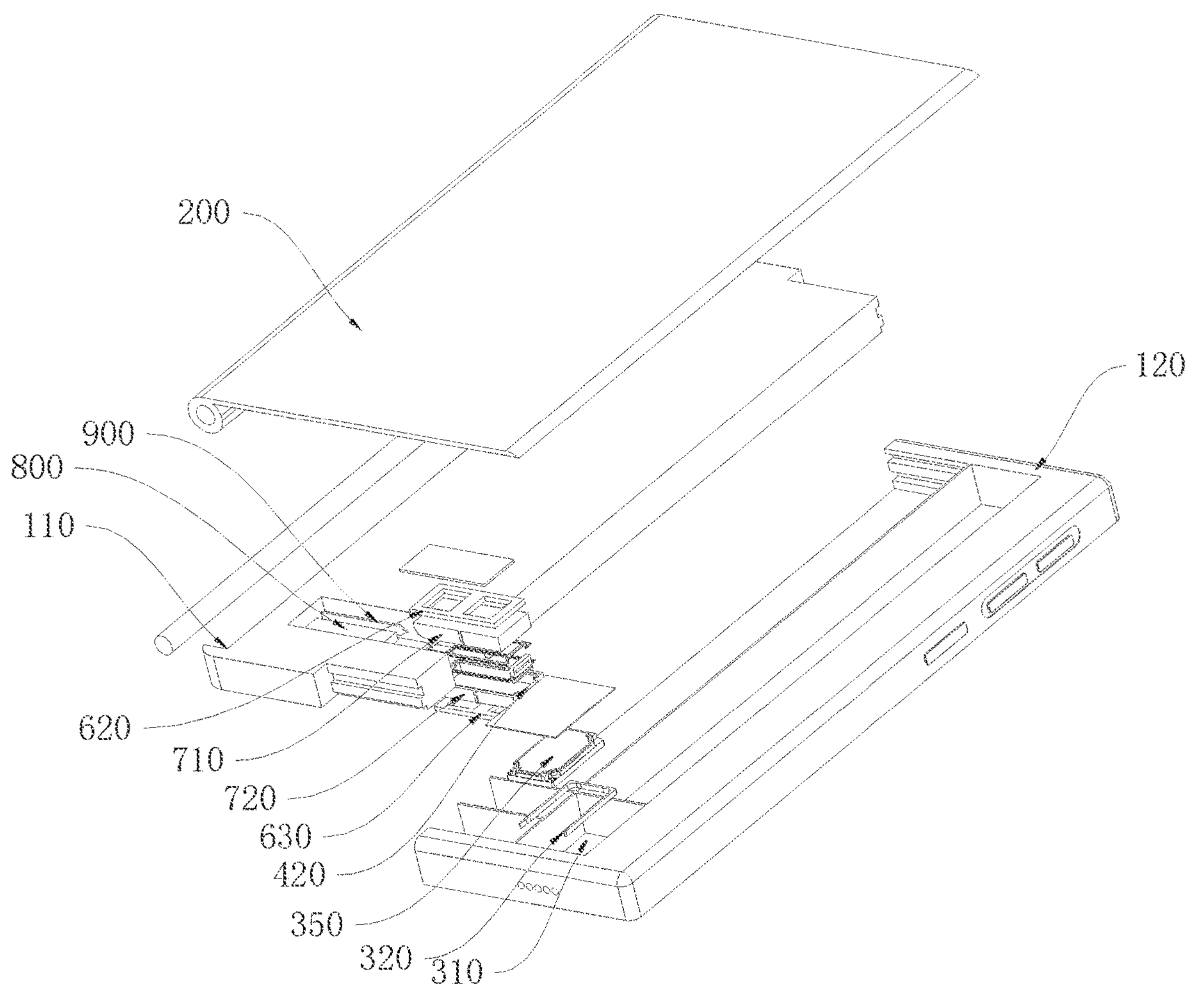
FIG. 6 is an exploded view of another embodiment of an electronic device according to this application.
Figure 7:
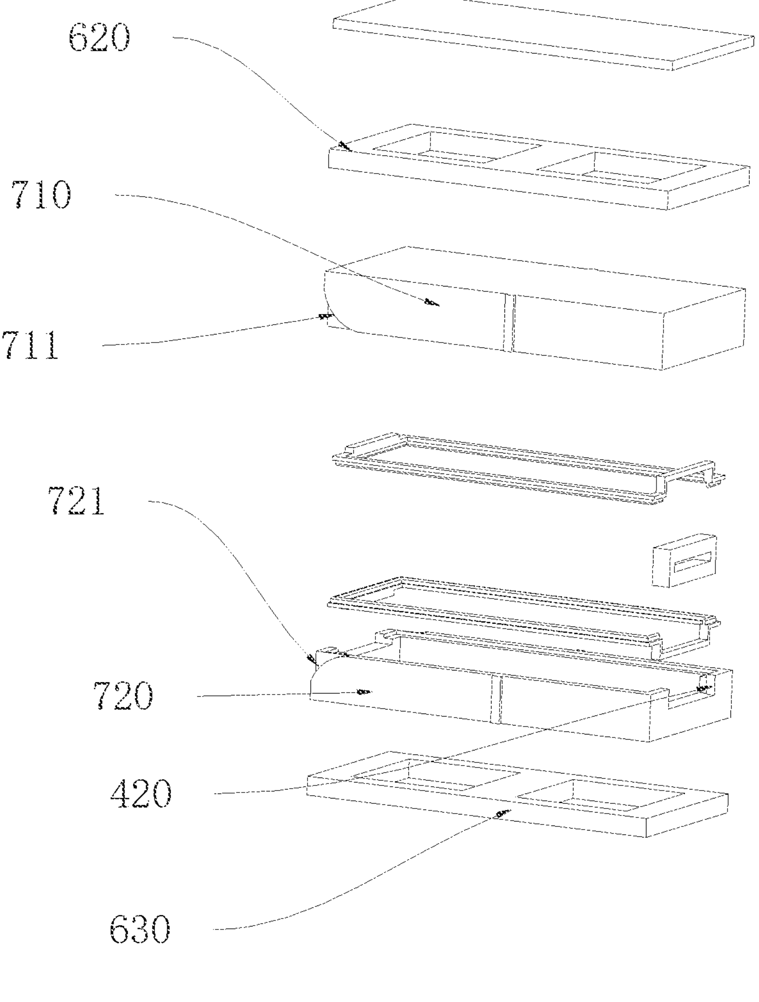
FIG. 7 is a partial exploded view of an electronic device according to this application.
Figure 8:
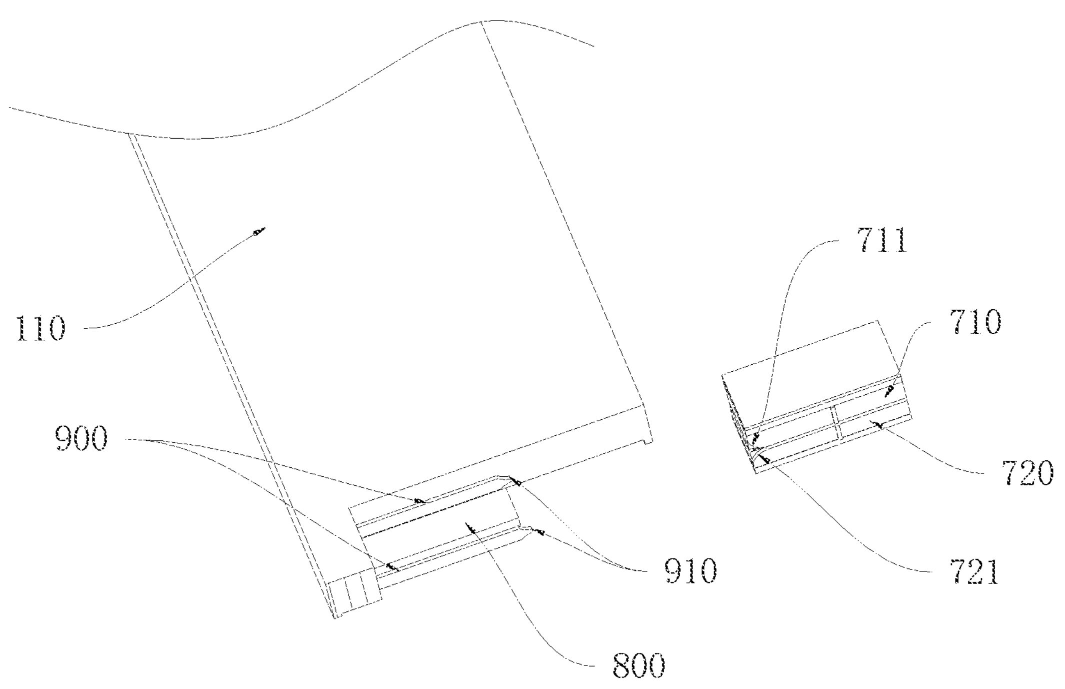
FIG. 8 is a partial exploded view of an electronic device according to this application.
Figure 9:
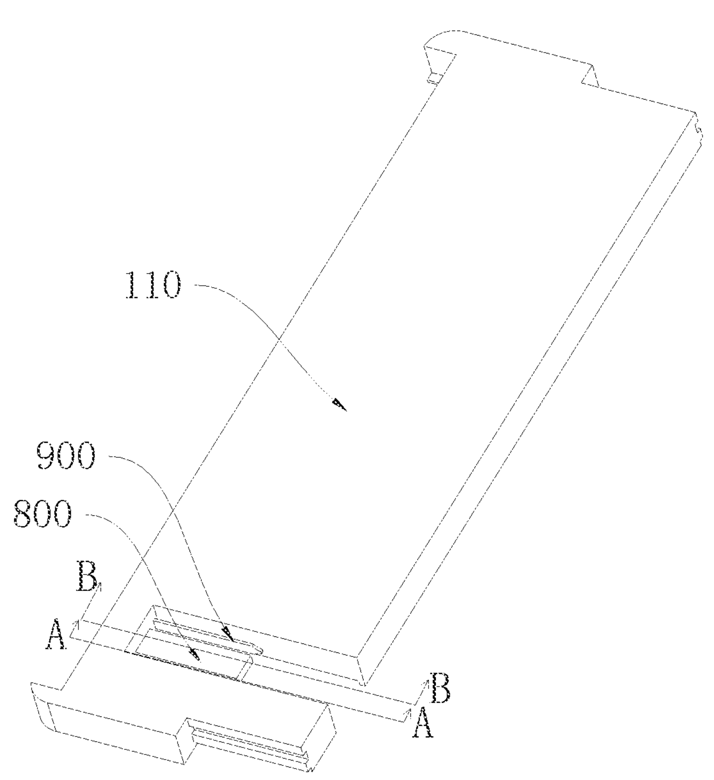
FIG. 9 is a schematic structural diagram of a first housing according to this application.
Figure 10:
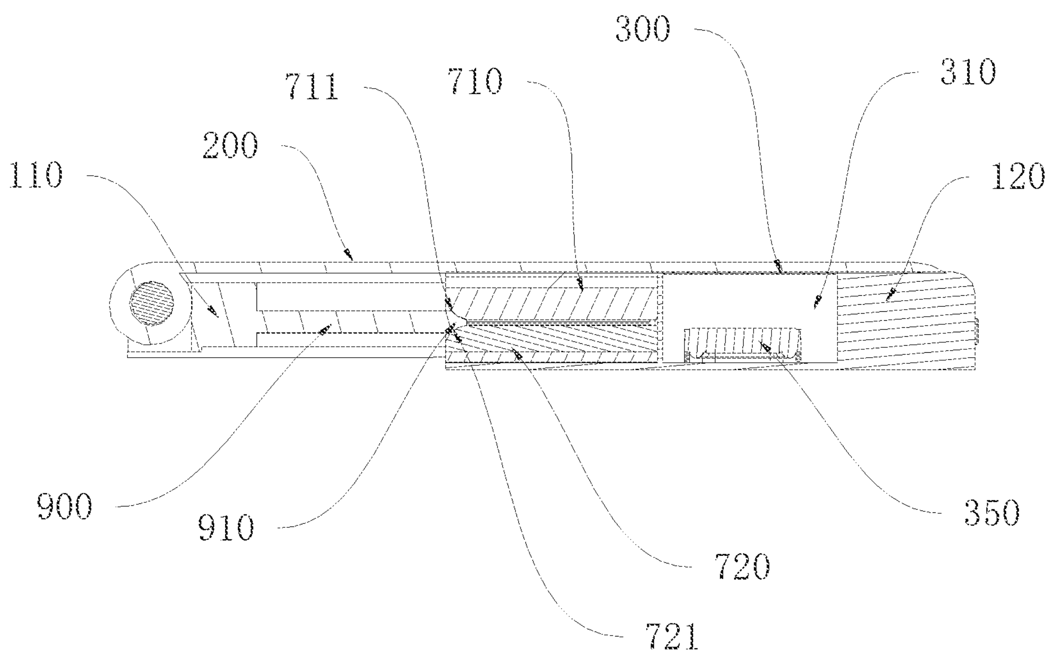
FIG. 10 is a sectional view along direction B-B in FIG. 9 of an electronic device in an expanded state according to this application.
Figure 11:
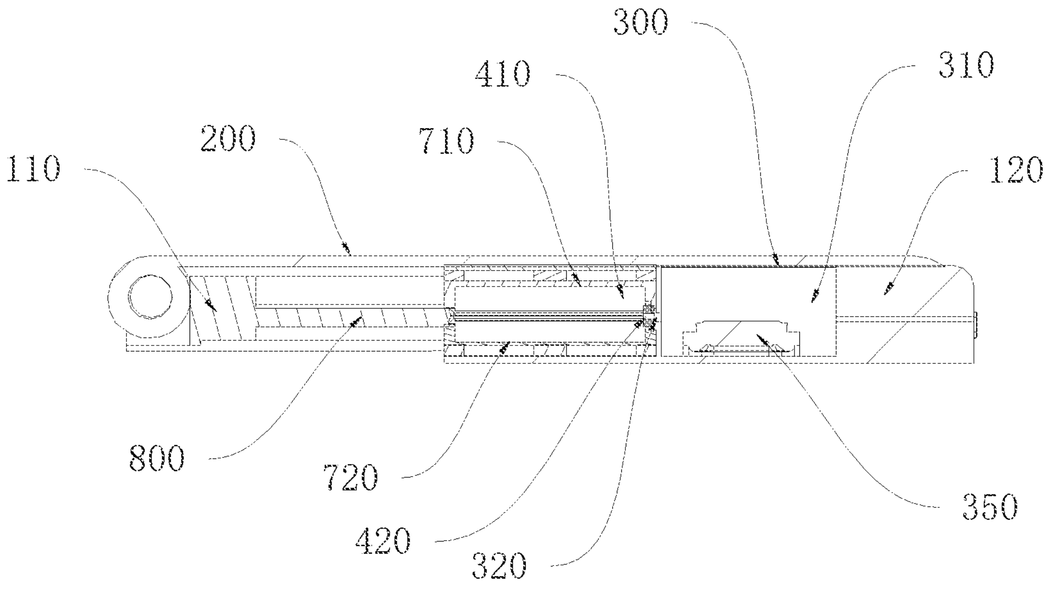
FIG. 11 is a sectional view along direction A-A in FIG. 9 of an electronic device in an expanded state according to this application.
Figure 12:
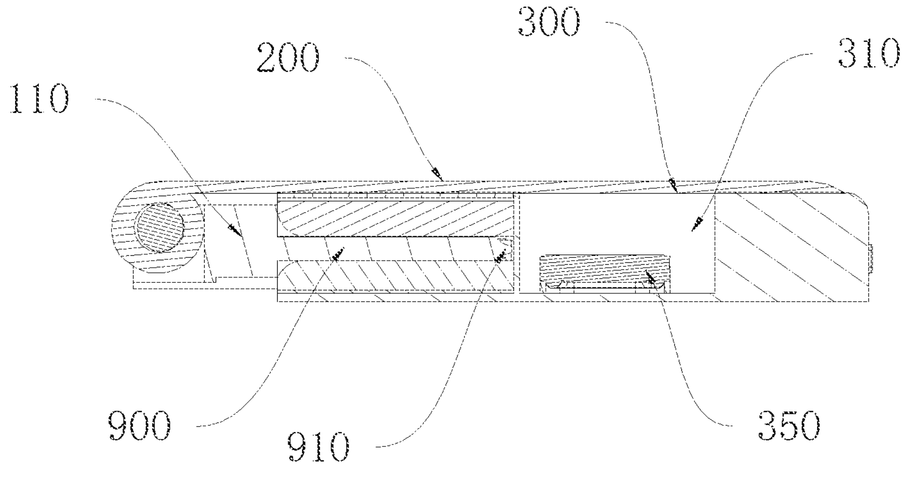
FIG. 12 is a sectional view along direction B-B in FIG. 9 of an electronic device in a contracted state according to this application.
Figure 13:
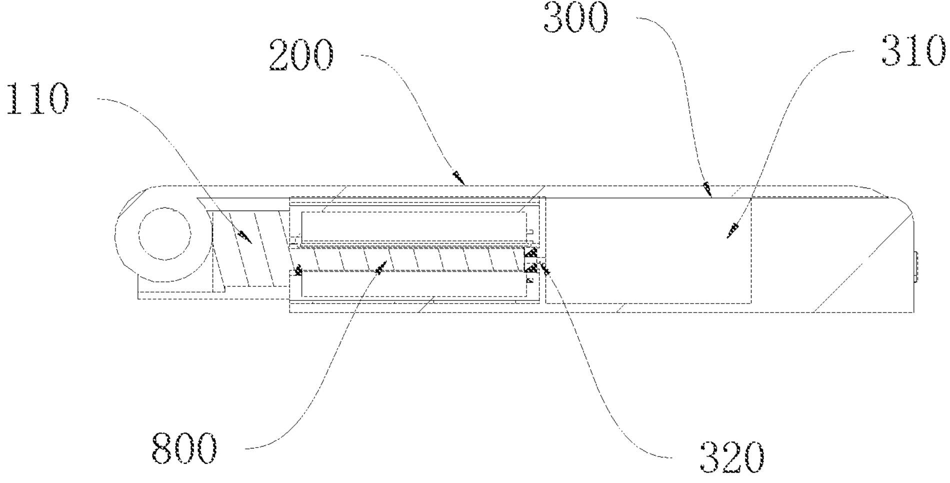
FIG. 13 is a sectional view along direction A-A in FIG. 9 of an electronic device in a contracted state according to this application.

As shown in FIG. 1 to FIG. 13, this application provides an electronic device including a device housing 100 and a sound generating module 300.

As a basic component of the electronic device, the device housing 100 is capable of providing a mounting base for other components of the electronic device. The device housing 100 includes a first housing portion 110 and a second housing portion 120. The first housing portion 110 is movably disposed on the second housing portion 120 to enable the electronic device to switch between a first state and a second state.

One of the first state and the second state is an expanded state, and the other is a contracted state. In a case that the first housing portion 110 and the second housing portion 120 are relatively far away from each other, the electronic device is in the expanded state, and in a case that they are relatively close to each other, the electronic device is in the contracted state.

The sound generating module 300 may be a receiver module, a speaker module, or any other sound-generating apparatus. A specific type of sound generating module 300 is not limited in the embodiments of this application. The sound generating module 300 is provided on one of the first housing portion 110 and the second housing portion 120.

The sound generating module 300 is provided with a first rear cavity 310 and a first connecting hole 320 that communicates with the first rear cavity 310. The electronic device is able to form a second rear cavity 410. Specifically, in the first state, the first rear cavity 310 communicates with the second rear cavity 410 via the first connecting hole 320, and the first rear cavity 310 and the second rear cavity 410 that communicate with each other jointly form a rear cavity of the sound generating module 300. This increases the volume of the rear cavity of the sound generating module 300, thereby improving the sound performance of the sound generating module 300. In the second state, the first connecting hole 320 is blocked, and only the first rear cavity 310 functions as the rear cavity of the sound generating module 300.

In the second state, the first connecting hole 320 can be blocked by a dedicated blocking cover plate or by another functional component 800 of the electronic device. The blocking method can vary, and this embodiment of this application does not impose restrictions on this.

In the electronic device described in this application, the sound generating module 300 is provided with a first rear cavity 310, and the electronic device is further able to form a second rear cavity 410, to fully utilize the internal space of the electronic device. In the expanded or contracted state of the electronic device, the first rear cavity 310 communicates with the second rear cavity 410, which in turn increases the volume of the rear cavity of the sound generating module 300 and improves sound performance, resulting in a more mellow and full sound.

In this embodiment of this application, the electronic device further includes a flexible display 200, and the flexible display 200 is provided on the device housing 100. Specifically, a first end of the flexible display 200 is connected to the first housing portion 110, and a second end of the flexible display 200 is connected to the second housing portion 120. The first end of the flexible display 200 is capable of moving along with the movement of the first housing portion 110, and the second end of the flexible display 200 is capable of moving along with the movement of the second housing portion 120. In a case that the first housing portion 110 moves relative to the second housing portion 120, the first end of the flexible display 200 also moves relative to the second end of the flexible display 200, thereby changing a display area between the first end and the second end of the flexible display 200. In a case that the electronic device has a relatively large display area, it provides a better visual experience to user, and in a case that the electronic device has a relatively small display area, it is more convenient for portability.

The first end of the flexible display 200 can be accommodated in the first housing portion 110 or can extend from the first housing portion 110, and/or the second end of the flexible display 200 can be accommodated in the second housing portion 120 or can extend from the second housing portion 120. There can be various manners for accommodation and extension, and this embodiment of this application does not impose restrictions on this.

Specifically, the flexible display 200 is provided with a first region and a second region connected to the first region.

In the expanded state, the first region and the second region are at least partially exposed to the electronic device. In this case, the electronic device has a relatively large display area, and the first rear cavity 310 is connected to the second rear cavity 410 via the first connecting hole 320. The first rear cavity 310 and the second rear cavity 410 in communication jointly form the rear cavity of the sound generating module 300, fully utilizing the internal space of the electronic device. This increases the volume of the rear cavity of the sound generating module 300 and improves the sound performance of the sound generating module 300.

In the contracted state, the first region is exposed to the electronic device, and the second region is accommodated in the device housing 100. In this case, the electronic device has a relatively small display area, and the first connecting hole 320 is blocked.

In this embodiment, in the expanded state, in the case that the electronic device has a relatively large display area, the large display area provides a better visual experience to user. In this case, the second rear cavity 410 communicates with the first rear cavity 310 to jointly form the rear cavity of the sound generating module 300, which in turn increases the volume of the rear cavity of the sound generating module 300 and improves the sound performance of the sound generating module 300, thus providing a better auditory experience to the user.

In the case that the electronic device has a relatively large display area, it can be used as a tablet, which requires higher sound performance. In this case, the second rear cavity 410 communicates with the first rear cavity 310 to jointly form the rear cavity of the sound generating module 300, which in turn increases the volume of the rear cavity of the sound generating module 300, improving the sound performance of the sound generating module 300, thereby meeting requirements for the sound performance of an electronic device with a relatively large display area.

In this embodiment of this application, the electronic device includes a cavity structure 400. The cavity structure 400 is provided with a second rear cavity 410 and a second connecting hole 420 that communicates with the second rear cavity 410, and the sound generating module 300 is provided with the first rear cavity 310 and the first connecting hole 320 that communicates with the first rear cavity 310. One of the sound generating module 300 and the cavity structure 400 is located on the first housing portion 110, and the other is located on the second housing portion 120. The sound generating module 300 and the cavity structure 400 can relatively slide along with relative movement between the first housing portion 110 and the second housing portion 120.

In the first state, the first connecting hole 320 and the second connecting hole 420 are in sealed alignment, and the first rear cavity 310 communicates with the second rear cavity 410 via the sealed alignment between the first connecting hole 320 and the second connecting hole 420. In this case, the second rear cavity 410 communicates with the first rear cavity 310 to jointly form the rear cavity of the sound generating module 300, so as to fully utilize the internal space of the electronic device. Communicating the second rear cavity 410 and the first rear cavity 310 increases the volume of the rear cavity of the sound generating module 300 and improves the sound performance of the sound generating module 300.

In the second state, the first connecting hole 320 and the second connecting hole 420 are misaligned. The cavity structure 400 blocks the first connecting hole 320. For example, in the second state, a side wall of the cavity structure 400 is precisely moved to align with the first connecting hole 320 to block the first connecting hole 320, and the first rear cavity 310 functions as the rear cavity of the sound generating module 300 alone.

In this embodiment, in the first state, the second rear cavity 410 of the cavity structure 400 can communicate with the first rear cavity 310 via the second connecting hole 420, thereby increasing the volume of the rear cavity of the sound generating module 300; and in the second state, the cavity structure 400 blocks the first connecting hole 320 to seal the first rear cavity 310, so that the first rear cavity 310 functions as the rear cavity of the sound generating module 300 alone.

In the foregoing embodiment, one of the sound generating module 300 and the cavity structure 400 is provided with a first positioning structure 430 and a second positioning structure 440 that are spaced apart, and the other is provided with a third positioning structure 330. In a case of the first state, the first positioning structure 430 and the third positioning structure 330 cooperate with each other. After the first positioning structure 430 and the third positioning structure 330 cooperate with each other, the sound generating module 300 and the cavity structure 400 are relatively fastened, so that the first connecting hole 320 and the second connecting hole 420 are aligned, thereby communicating the second rear cavity 410 and the first rear cavity 310. In a case of the second state, the second positioning structure 440 and the third positioning structure 330 cooperate with each other. After the second positioning structure 440 and the third positioning structure 330 cooperate with each other, the sound generating module 300 and the cavity structure 400 are relatively fastened, so that the first connecting hole 320 and the cavity structure 400 are aligned. For example, the first connecting hole 320 faces the side wall of the cavity structure 400, the cavity structure 400 blocks the first connecting hole of the first rear cavity 310 to seal the first rear cavity 310, so that the first rear cavity 310 functions as the rear cavity of the sound generating module 300 alone. In a case that the first rear cavity 310 communicates with the second rear cavity 410 or that the first connecting hole 320 is blocked, the positioning structures can be used to position the sound generating module 300 and the cavity structure 400 to prevent relative sliding.

The positioning structures can take various forms, such as concave-convex positioning structures and magnetic positioning structures.

In this embodiment of this application, concave-convex positioning structures are used as an example for description. Both the first positioning structure 430 and the second positioning structure 440 are positioning protrusions, and the third positioning structure 330 is a positioning groove. Alternatively, the first positioning structure 430 and the second positioning structure 440 are positioning grooves, and the third positioning structure 330 is a positioning protrusion. In a case that the sound generating module 300 slides relative to the cavity structure 400 to a predetermined position, the positioning protrusion enters the positioning groove, achieving the positioning of the sound generating module 300 and the cavity structure 400.

The sound generating module 300 is fixed on one of the first housing portion 110 and the second housing portion 120, and the cavity structure 400 is movably disposed in the other of the first housing portion 110 and the second housing portion 120. The electronic device further includes a first elastic member 610. The first elastic member 610 is connected between the cavity structure 400 and the first housing portion 110 or between the cavity structure 400 and the second housing portion 120. The first elastic member 610 drives the cavity structure 400 to move towards the sound generating module 300. The first elastic member 610 may be a leaf spring, a coil spring, a cushion, or other elastic members.

Disposing the first elastic member 610 ensures a better fit between the cavity structure 400 and the sound generating module 300, so that the second rear cavity 410 communicates with the first rear cavity 310 in the first state, and the cavity structure 400 seals the first connecting hole 320 in the second state. The disposing of the first elastic member 610 facilitates concave-convex positioning fit between the positioning structures. Due to the relative sliding between the cavity structure 400 and the sound generating module 300 during switching between the two states, the positioning protrusion needs to slide out of one positioning groove and then slide into another positioning groove. This requires the cavity structure 400 to have a given degree of movement in the convex direction of the protrusion, while disposing the first elastic member 610 can enable the cavity structure 400 to have a given degree of movement in the convex direction of the protrusion. In the case that the positioning protrusion needs to slide out of the positioning groove, the cavity structure 400 compresses the first elastic member 610, moving relatively away from the sound generating module 300 in the convex direction of the positioning protrusion. After the positioning protrusion slides into the positioning groove, the first elastic member 610 compresses the cavity structure 400, driving the cavity structure 400 to move towards the sound generating module 300, ensuring a better fit between the cavity structure 400 and the sound generating module 300.

Further, in this embodiment, the cavity structure 400 is provided with a guiding protrusion 121, and one of the first housing portion 110 and the second housing portion 120 is provided with a guiding groove 450, where the guiding protrusion 121 matches with the guiding groove 450. Alternatively, the cavity structure 400 is provided with a guiding groove 450, and the first housing portion 110 or the second housing portion 120 is provided with a guiding protrusion 121, where the guiding protrusion 121 and the guiding groove 450 are matched. Disposing the guiding protrusion 121 and the guiding groove 450 can better guide the cavity structure 400 to move a given distance relative to the sound generating module 300 in the convex direction of the positioning protrusion in a case that the positioning protrusion slides into or out of the positioning groove. Limiting fit between the cavity structure 400 and the first housing portion 110 or between the cavity structure 400 and the second housing portion 120 in the moving direction of the first housing portion 110 can ensure that the cavity structure 400 moves synchronously with one of the first housing portion 110 and the second housing portion 120 in a moving direction of the first housing portion 110, avoiding relative movement between the cavity structure 400 and the first housing portion 110 or between the cavity structure 400 and the second housing portion 120 in the moving direction of the first housing portion 110 caused by friction between the sound generating module 300 and the cavity structure 400. This ensures precise alignment between the first connecting hole 320 of the first rear cavity 310 and the second connecting hole 420 of the second rear cavity 410 each time the first housing portion 110 and the second housing portion 120 relatively move to the first state.

In this embodiment of this application, the electronic device includes a first rear cavity component 710 and a second rear cavity component 720. The first rear cavity component 710, the second rear cavity component 720, and the sound generating module 300 are all disposed on one of the first housing portion 110 and the second housing portion 120. The other of the first housing portion 110 and the second housing portion 120 is provided with a functional component 800. For example, the functional component 800 can be a circuit board, a battery, or another functional component.

In this embodiment, in the expanded state, the second rear cavity 410 is enclosed by at least the first rear cavity component 710 and the second rear cavity component 720. The second rear cavity 410 can be enclosed solely by the first rear cavity component 710 and the second rear cavity component 720, or can be enclosed by a combination of the first rear cavity component 710, the second rear cavity component 720, and another structure. At least one of the first rear cavity component 710 and the second rear cavity component 720 has a second connecting hole 420 formed. Specifically, it can be that the first rear cavity component 710 has the second connecting hole 420, or that the second rear cavity component 720 has the second connecting hole 420, or that the first rear cavity component 710 and the second rear cavity component 720 each have a half-hole, and the two half-holes cooperate to form the second connecting hole 420. The second connecting hole 420 communicates with the second rear cavity 410. The first rear cavity 310 communicates with the second rear cavity 410 via the sealed alignment of the first connecting hole 320 and the second connecting hole 420. The second rear cavity 410 and the first rear cavity 310 in communication jointly form the rear cavity of the sound generating module 300, fully utilizing the internal space of the electronic device. Communicating the second rear cavity 410 and the first rear cavity 310 increases the volume of the rear cavity of the sound generating module 300 and improves the sound performance of the sound generating module 300.

In this embodiment, in the contracted state, the functional component 800 moves to a position between the first rear cavity component 710 and the second rear cavity component 720, and the functional component 800 blocks the first connecting hole 320. The first rear cavity component 710 and the second rear cavity component 720 provide an installation space for the functional component 800, fully utilizing the space between the first rear cavity component 710 and the second rear cavity component 720 to arrange the functional component 800 in the electronic device. In addition, the functional component 800 can block the first connecting hole 320, further utilizing the functional component 800, allowing the functional component 800 to serve multiple purposes, not only performing own function of the functional component 800 but also blocking the first connecting hole 320.

In this embodiment, the space between the first rear cavity component 710 and the second rear cavity component 720 is a reused space. In the first state, the first rear cavity component 710 and the second rear cavity component 720 enclose the second rear cavity 410. Communicating the second rear cavity 410 and the first rear cavity 310 increases the volume of the rear cavity of the sound generating module 300 and improves the sound performance of the sound generating module 300. In the second state, the functional component 800 can be accommodated between the first rear cavity component 710 and the second rear cavity component 720, fully utilizing the space between the first rear cavity component 710 and the second rear cavity component 720. In addition, the functional component 800 positioned between the first rear cavity component 710 and the second rear cavity component 720 can also block the first connecting hole 320.

Specifically, the first rear cavity component 710 is movably arranged relative to the second rear cavity component 720, and the functional component 800 is capable of moving along with one of the first housing portion 110 and the second housing portion 120. In the expanded state, the first rear cavity component 710 moves to a position at which it aligns with the second rear cavity component 720 to form the second rear cavity 410, and the functional component 800 is located outside the second rear cavity 410. The second rear cavity 410 and the first rear cavity 310 in communication jointly form the rear cavity of the sound generating module 300. Communicating the second rear cavity 410 and the first rear cavity 310 increases the volume of the rear cavity of the sound generating module 300 and improves the sound performance of the sound generating module 300. In the contracted state, the functional component 800 moves to the position between the first rear cavity component 710 and the second rear cavity component 720, the functional component 800 blocks the first connecting hole 320, and the first rear cavity component 710 is separated from the second rear cavity component 720.

In this embodiment of this application, the electronic device further includes a separating member 900. The separating member 900 is fixed relative to the functional component 800 and is provided with a tip 910. In the expanded state, the joint region of the first rear cavity component 710 and the second rear cavity component 720 is positioned facing the tip 910. In the contracted state, the separating member 900 is supported between the first rear cavity component 710 and the second rear cavity component 720. The separating member 900 can extend into the joint region of the first rear cavity component 710 and the second rear cavity component 720 via the tip 910, and then separate the first rear cavity component 710 and the second rear cavity component 720, so the functional component 800 can be accommodated in the space between the first rear cavity component 710 and the second rear cavity component 720. In this embodiment, the separating member 900 may alternatively be another functional component of the electronic device.

In this embodiment, the separating member 900 is fixed relative to the functional component 800. The first rear cavity component 710 is provided with a first chamfered surface 711, and the second rear cavity component 720 is provided with a second chamfered surface 721. In the expanded state, the first chamfered surface 711 and the second chamfered surface 721 form a guiding space. An end portion or the tip 910 of the separating member 900 can extend into the guiding space formed by the first chamfered surface 711 and the second chamfered surface 721. A width of the guiding space decreases in a direction away from the separating member 900, where the width refers to a dimension of the guiding space in an alignment direction of the first rear cavity component 710 and the second rear cavity component 720.

In this embodiment, the first rear cavity component 710 and the second rear cavity component 720 can form a cylindrical cavity structure 400. The cylindrical cavity structure 400 is provided with holes at both ends, where the hole at the first end can be the second connecting hole 420, and the hole at the second end is for the extension of the functional component 800. The functional component 800 can extend into the hole at the second end to enclose the second rear cavity 410 together with the first rear cavity component 710 and the second rear cavity component 720. The functional component 800 can further extend into the hole at the first end and block the first connecting hole 320. The functional component 800 fits with the cylindrical cavity structure 400 functions in a manner similar to a piston and a piston rod.

The first rear cavity component 710 and the second rear cavity component 720 can be separated along with relative movement between the first housing portion 110 and the second housing portion 120. In this case, other components of the electronic device can be accommodated between the first rear cavity component 710 and the second rear cavity component 720. Alternatively, the first rear cavity component 710 and the second rear cavity component 720 can keeping abutting against each other without a structure to separate the first rear cavity component 710 and the second rear cavity component 720, thus simplifying the structure of the electronic device and facilitating the assembly.

In the foregoing embodiments, a second elastic member 620 can be provided to drive the first rear cavity component 710 to move. The second elastic member 620 is provided between the first rear cavity component 710 and the first housing portion 110 or between the first rear cavity component 710 and the second housing portion 120. The second elastic member 620 can drive the first rear cavity component 710 to move towards the second rear cavity component 720, so that the first rear cavity component 710 abuts against the second rear cavity component 720. The second elastic member 620 may be a leaf spring, a coil spring, a cushion, or other elastic members.

Further, a third elastic member 630 can be provided to drive the second rear cavity component 720 to move. The third elastic member 630 is provided between the second rear cavity component 720 and the first housing portion 110 or between the second rear cavity component 720 and the second housing portion 120. The third elastic member 630 can drive the second rear cavity component 720 to move towards the first rear cavity component 710, so that the second rear cavity component 720 abuts against the first rear cavity component 710. The third elastic member 630 may be a leaf spring, a coil spring, a cushion, or other elastic members.

The above embodiments of this application focus on the differences between the embodiments. As long as different features of improvement in the embodiments are not contradictory, they can be combined to form a more preferred embodiment. Further descriptions are omitted herein for the purpose of brevity.

The foregoing descriptions are merely embodiments of this application and are not intended to limit the application. For persons skilled in the art, this application may have various changes and variations. Any modifications, equivalent replacements, and improvements made without departing from the spirit and principle of this application shall fall within the protection scope of the claims of this application.

What is claimed is:

1. An electronic device comprising a device housing and a sound generating module, wherein the device housing comprises a first housing portion and a second housing portion, the first housing portion is movably disposed on the second housing portion to enable the electronic device to switch between a first state and a second state, the sound generating module is located on one of the first housing portion and the second housing portion, and the sound generating module is provided with a first rear cavity and a first connecting hole communicating with the first rear cavity, wherein the electronic device is able to form a second rear cavity, wherein one of the first state and the second state is an expanded state, and the other is a contracted state;

the electronic device further comprises a cavity structure, a second connecting hole and a functional component;

in the first state, the first connecting hole is in sealed alignment with the second connecting hole, and the first rear cavity communicates with the second rear cavity via the first connecting hole and the second connecting hole; and in the second state, the cavity structure blocks the first connecting hole, or, the functional component blocks the first connecting hole.

2. The electronic device according to claim 1, wherein the electronic device further comprises a flexible display, wherein a first end of the flexible display is connected to the first housing portion, and a second end of the flexible display is connected to the second housing portion, the flexible display having a first region and a second region connected to the first region, wherein in the expanded state, the first region and the second region are at least partially exposed to the electronic device, and the first rear cavity communicates with the second rear cavity via the first connecting hole; and in the contracted state, the first region is exposed to the electronic device, the second region is accommodated within the device housing, and the first connecting hole is blocked.

3. The electronic device according to claim 1, wherein the cavity structure is provided with the second rear cavity and the second connecting hole communicating with the second rear cavity;

one of the sound generating module and the cavity structure is located on the first housing portion, and the other is located on the second housing portion, and the sound generating module and the cavity structure are capable of sliding relative to each other along with relative movement between the first housing portion and the second housing portion, wherein in the second state, the first connecting hole is staggered with the second connecting hole.

4. The electronic device according to claim 3, wherein one of the sound generating module and the cavity structure is provided with a first positioning structure and a second positioning structure spaced apart, and the other is provided with a third positioning structure, wherein in the first state, the first positioning structure cooperates with the third positioning structure; and in the second state, the second positioning structure cooperates with the third positioning structure.

5. The electronic device according to claim 4, wherein the first positioning structure and the second positioning structure are both positioning protrusions, and the third positioning structure is a positioning groove, or the first positioning structure and the second positioning structure are both positioning grooves, and the third positioning structure is a positioning protrusion.

6. The electronic device according to claim 5, wherein the sound generating module is fixed on one of the first housing portion and the second housing portion, the cavity structure is movably disposed in the other of the first housing portion and the second housing portion, and the electronic device comprises a first elastic member, wherein the first elastic member is connected between the cavity structure and the first housing portion or between the cavity structure and the second housing portion, and the first elastic member drives the cavity structure to move towards the sound generating module.

7. The electronic device according to claim 6, wherein the cavity structure is provided with a guiding protrusion, and the first housing portion or the second housing portion is provided with a guiding groove, wherein the guiding protrusion matches with the guiding groove; or the cavity structure is provided with a guiding groove, and the first housing portion or the second housing portion is provided with a guiding protrusion, wherein the guiding protrusion matches with the guiding groove, wherein the cavity structure is in limiting fit with the first housing portion or the second housing portion in a moving direction of the first housing portion.

8. The electronic device according to claim 1, wherein the electronic device comprises a first rear cavity component and a second rear cavity component, wherein the first rear cavity component, the second rear cavity component, and the sound generating module are all located on one of the first housing portion and the second housing portion, and the other of the first housing portion and the second housing portion is provided with the functional component, wherein in the expanded state, the second rear cavity is enclosed by at least the first rear cavity component and the second rear cavity component, and at least one of the first rear cavity component and the second rear cavity component is formed with the second connecting hole, wherein the second connecting hole communicates with the second rear cavity, and the first rear cavity communicates with the second rear cavity via the sealed alignment of the first connecting hole and the second connecting hole; and in the contracted state, the functional component moves to a position between the first rear cavity component and the second rear cavity component.

9. The electronic device according to claim 8, wherein the first rear cavity component is movably disposed relative to the second rear cavity component, and the functional component is capable of moving with the first housing portion or the second housing portion, wherein in the expanded state, the first rear cavity component moves to a position at which it aligns with the second rear cavity component to form the second rear cavity, and the functional component is located outside the second rear cavity; and in the contracted state, the functional component moves to a position between the first rear cavity component and the second rear cavity component, the functional component blocks the first connecting hole, and the first rear cavity component is separated from the second rear cavity component.

10. The electronic device according to claim 9, wherein the electronic device further comprises a separating member, wherein the separating member is fixed relative to the functional component, and the separating member has a tip, wherein in the expanded state, the joint region of the first rear cavity component and the second rear cavity component is disposed facing the tip, and in the contracted state, the separating member supports between the first rear cavity component and the second rear cavity component.

11. The electronic device according to claim 9, wherein the electronic device further comprises a separating member, wherein the separating member is fixed relative to the functional component, the first rear cavity component is provided with a first chamfered surface, and the second rear cavity component is provided with a second chamfered surface, wherein in the expanded state, the first chamfered surface and the second chamfered surface form a guiding space, and width of the guiding space decreases in a direction away from the separating member, wherein the width is a dimension of the guiding space in an alignment direction of the first rear cavity component and the second rear cavity component.

12. The electronic device according to claim 9, wherein a second elastic member is provided between the first rear cavity component and the first housing portion or between the first rear cavity component and the second housing portion, and the second elastic member is capable of driving the first rear cavity component to move towards the second rear cavity component so that the first rear cavity component abuts against the second rear cavity component.

13. The electronic device according to claim 12, wherein a third elastic member is provided between the second rear cavity component and the first housing portion or between the second rear cavity component the second housing portion, and the third elastic member is capable of driving the second rear cavity component to move towards the first rear cavity component so that the second rear cavity component abuts against the first rear cavity component.

* * * * *